Aug. 25, 1953 T. M. COLE ET AL 2,650,280

MULTIPOLE CIRCUIT BREAKER AND TRIPPING DEVICE THEREFOR

Original Filed Aug. 8, 1944 10 Sheets-Sheet 1

INVENTORS
THOMAS M. COLE AND
WILLIAM H. LANTZ JR.
BY Edwin Levisohn +
Harry Cole
ATTORNEYS INVENTORS
THOMAS M. COLE AND
WILLIAM H. LANTZ JR.
BY Edwin Levisohn + Harry Cohen
ATTORNEYS INVENTORS
THOMAS M. COLE AND
WILLIAM H. LANTZ, JR.
BY Edwin Levisohn +
Harry Cole
ATTORNEYS Aug. 25, 1953 T. M. COLE ET AL 2,650,280

MULTIPOLE CIRCUIT BREAKER AND TRIPPING DEVICE THEREFOR

Original Filed Aug. 8, 1944 10 Sheets-Sheet 4

INVENTORS
THOMAS M. COLE AND
WILLIAM H. LANTZ JR.
BY Edwin Levisohn &
Harry Cole
ATTORNEYS

MULTIPOLE CIRCUIT BREAKER AND TRIPPING DEVICE THEREFOR

Original Filed Aug. 8, 1944 10 Sheets-Sheet 5

INVENTORS
THOMAS M. COLE AND
WILLIAM H. LANTZ JR.
BY Edwin Levisohn +
Harry Cole
ATTORNEYS INVENTORS
THOMAS M. COLE AND
WILLIAM H. LANTZ JR.
BY Edwin Levisohn + Harry Cole
ATTORNEYS

MULTIPOLE CIRCUIT BREAKER AND TRIPPING DEVICE THEREFOR

Original Filed Aug. 8, 1944 10 Sheets-Sheet 7

INVENTORS
THOMAS M. COLE AND
WILLIAM H. LANTZ JR.
BY Edwin Lenrolo +
Harry Cole
ATTORNEYS Aug. 25, 1953 T. M. COLE ET AL 2,650,280

MULTIPOLE CIRCUIT BREAKER AND TRIPPING DEVICE THEREFOR

Original Filed Aug. 8, 1944 10 Sheets-Sheet 8

INVENTORS
THOMAS M. COLE AND
WILLIAM H. LANTZ JR.
BY Edwin Lenschow +
Harry Cole
ATTORNEYS INVENTORS
THOMAS M. COLE AND
WILLIAM H. LANTZ JR.
BY Edwin Levisohn + Harry Cole
ATTORNEYS

MULTIPOLE CIRCUIT BREAKER AND TRIPPING DEVICE THEREFOR

Original Filed Aug. 8, 1944

10 Sheets-Sheet 10

INVENTORS
THOMAS M. COLE AND
WILLIAM H. LANTZ JR.
BY Edwin Levisohn +
Harry Cole
ATTORNEYS Patented Aug. 25, 1953

2,650,280

UNITED STATES PATENT OFFICE 2,650,280

MULTIPOLE CIRCUIT BREAKER AND TRIPPING DEVICE THEREFOR

Thomas M. Cole, New York, N. Y., and William H. Lantz, Jr., Newington, Conn., assignors to Federal Electric Products Company, Newark, N. J.

Original application August 8, 1944, Serial No. 548,550, now Patent No. 2,487,637, dated November 8, 1949. Divided and this application August 12, 1949, Serial No. 109,868

16 Claims. (Cl. 200—116)

This invention relates to multi-pole circuit breakers and to tripping devices therefor. More particularly, the invention is concerned with a multi-pole circuit breaker which can be manually opened and closed and which is also opened automatically at all of the poles upon the occurrence of an overload in the circuit at any one of the poles.

In general, the circuit breaker is of the type disclosed in the application for Letters Patent of the United States, Serial No. 467,842, now Patent No. 2,421,830, June 10, 1947, filed December 4, 1942, by Louis W. Cole and Thomas M. Cole, and the tripping device of the present application is also, in general, of the type disclosed in said application.

The present invention will be fully understood from the following description considered in connection with the accompanying drawings illustrating the presently preferred embodiment of the invention.

In the drawings:

Fig. 6 is a sectional view on the line 6—6 of Fig. 3, but with the casing cover in place, showing the circuit breaker in the manually opened condition thereof and showing part of the tripping device in its said condition;

Figures 1, 2:
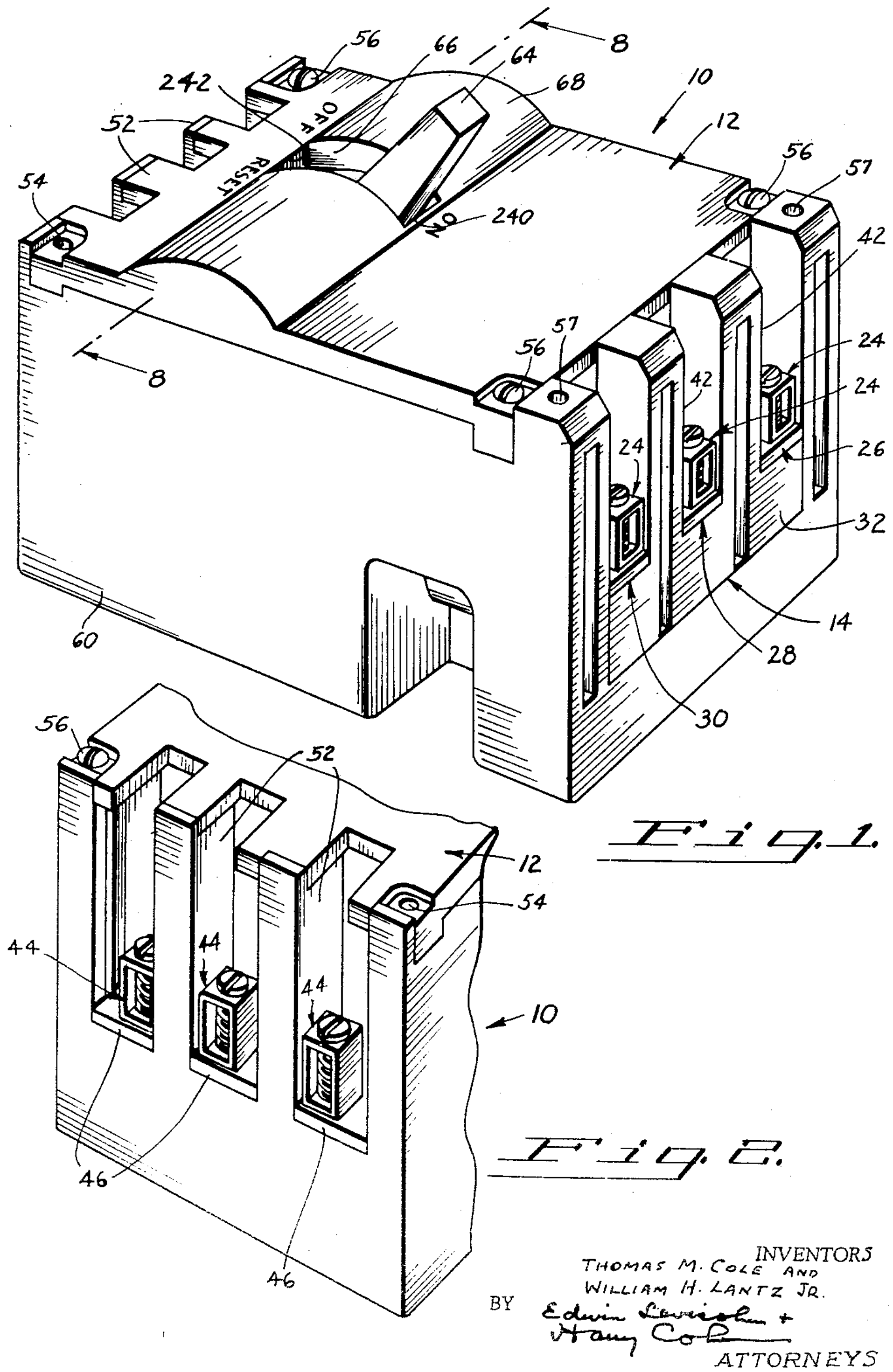
Fig. 1 is a perspective view of a circuit breaker embodying the present invention.
Fig. 2 is a fragmentary perspective view of the circuit breaker at the load side thereof.
Figure 3:
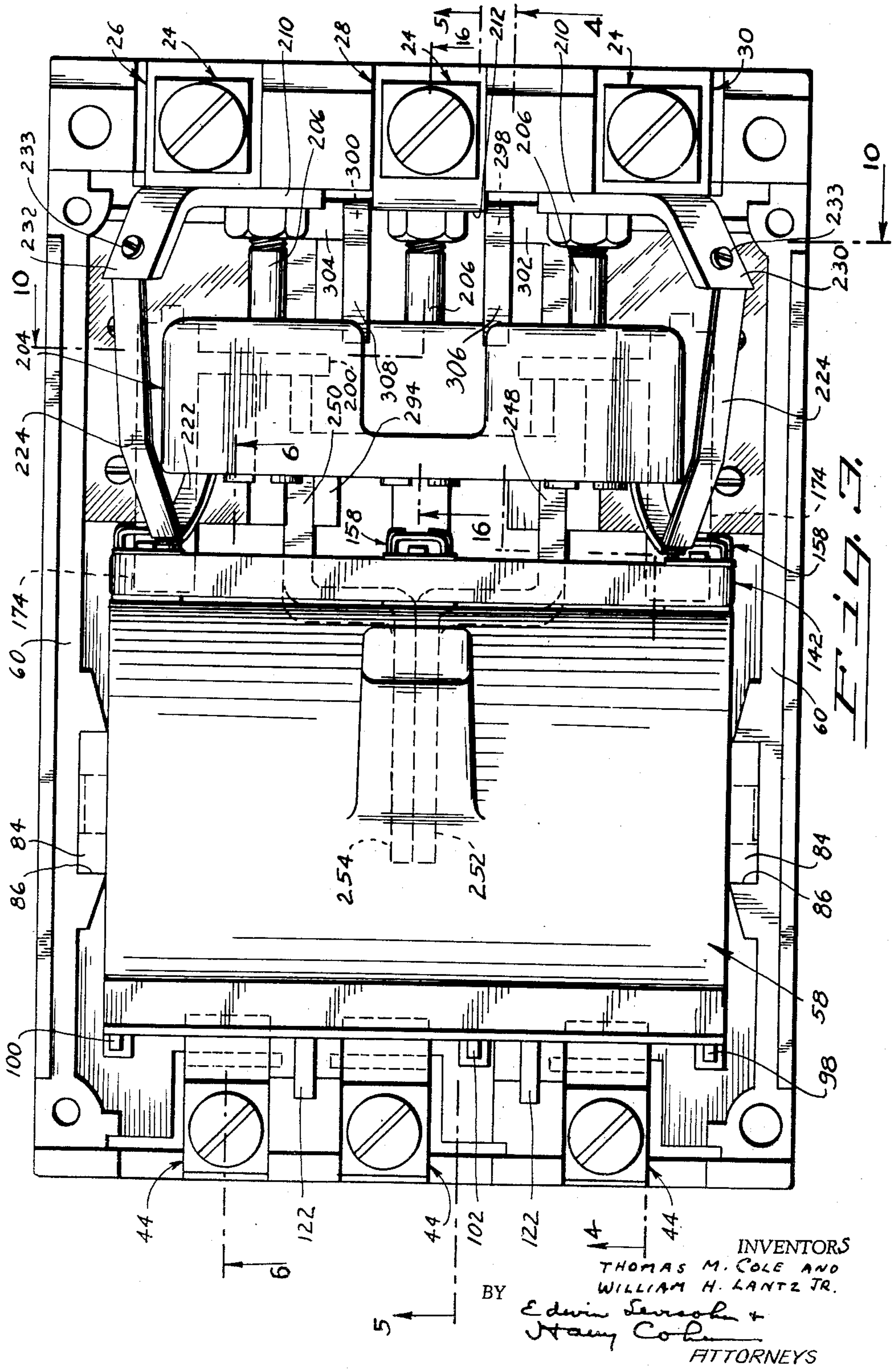
Fig. 3 is a top plan view of a circuit breaker, with the casing cover removed.
Figure 7:
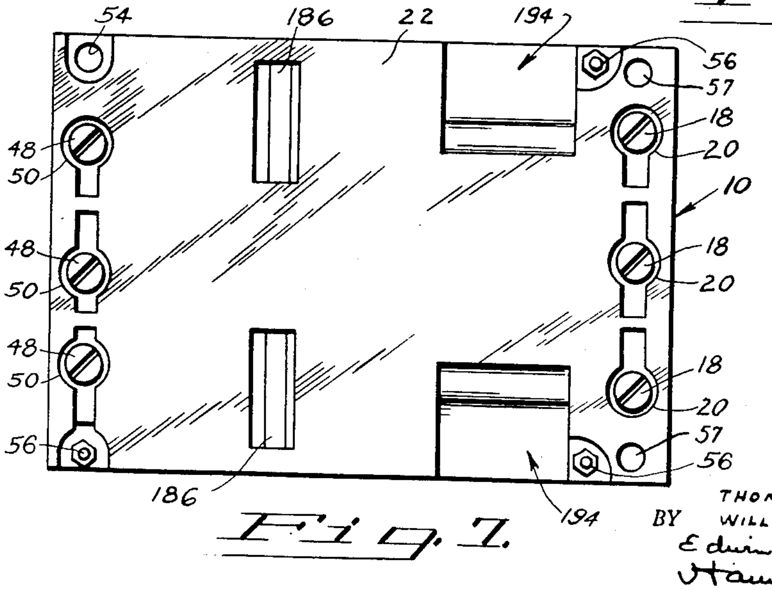
Fig. 7 is a bottom or rear plan view of the casing of the circuit breaker.
Figure 8:
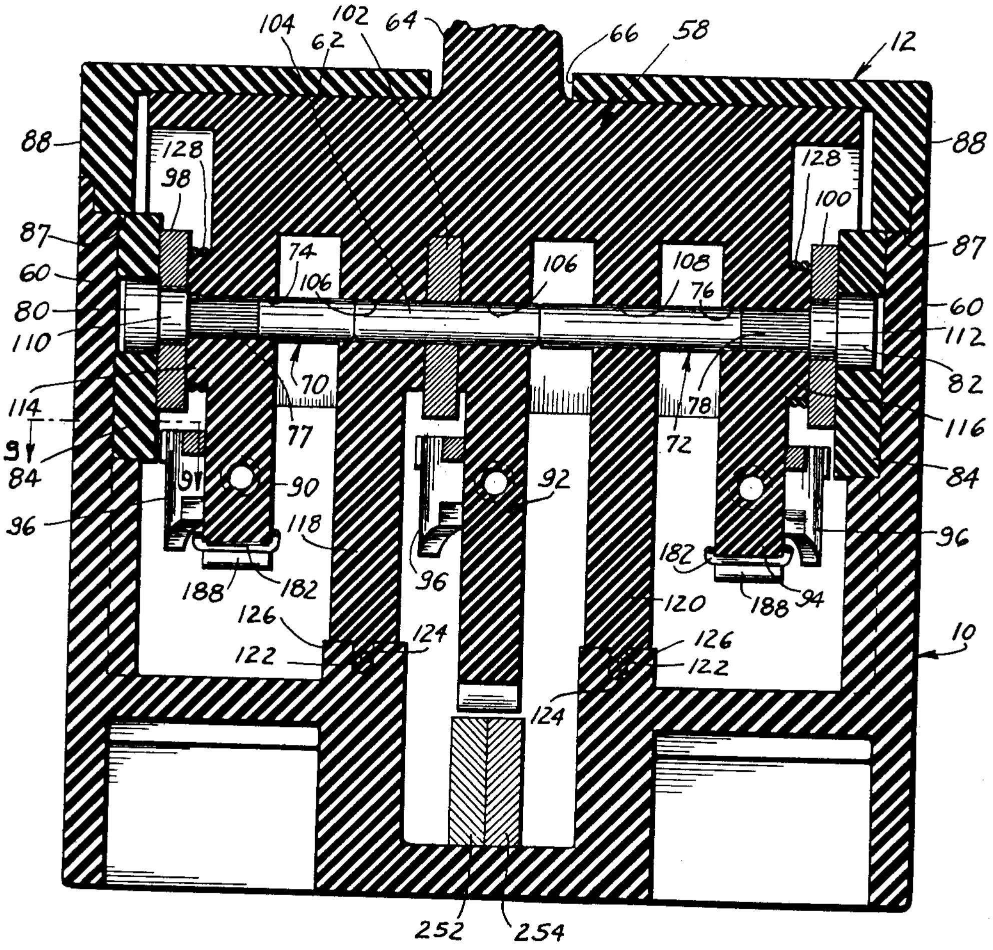
Figure 9:
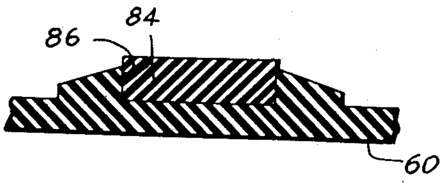
Fig. 9 is a view on the line 9—9 of Fig. 8.
Figures 15, 16:
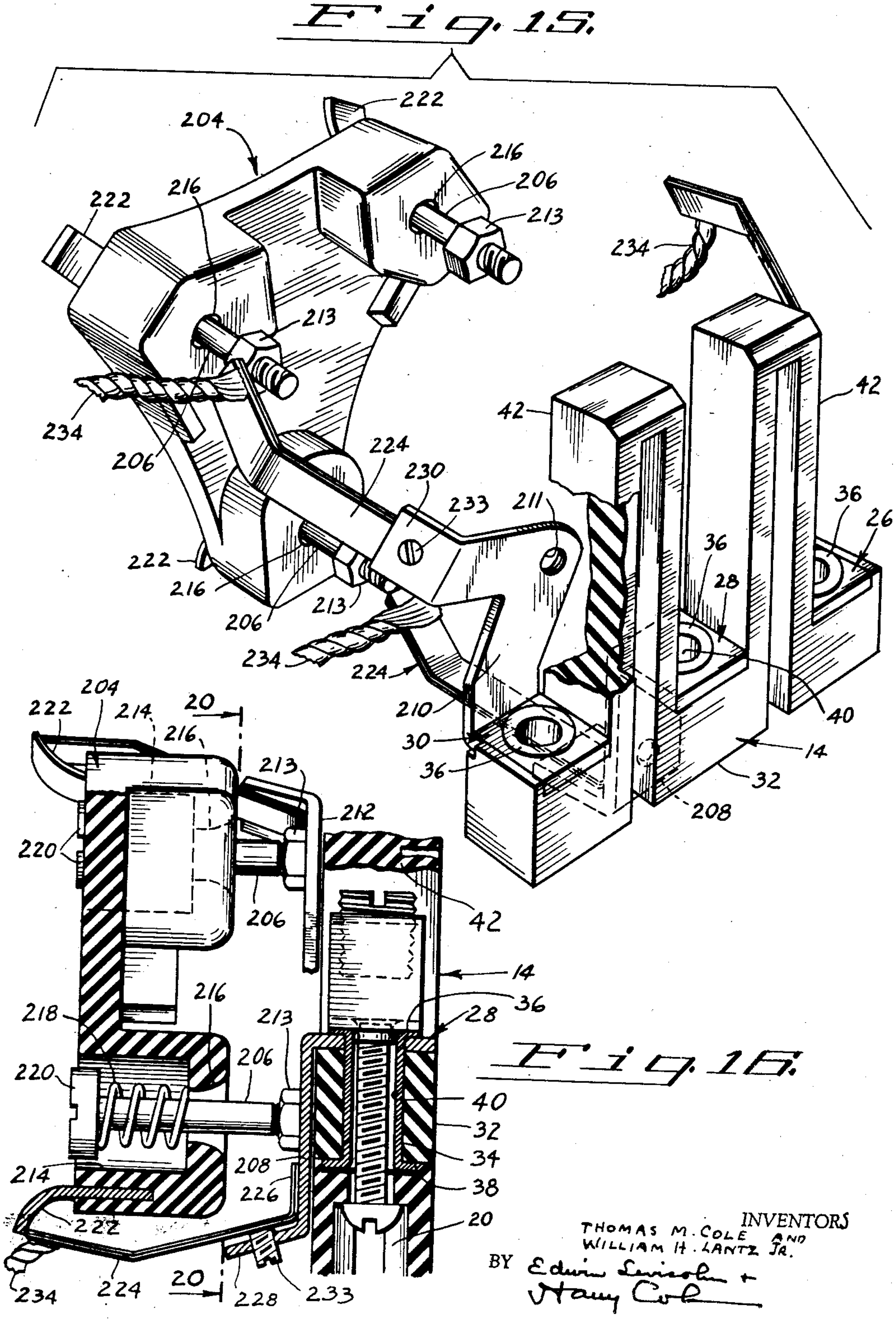
Fig. 15 is a perspective view of parts of the tripping device illustrated in separated but related positions with portions omitted for illustrative purposes.
Fig. 16 is a sectional view on the line 16—16 of Fig. 3, parts being omitted for the purpose of illustration.

Referring to the drawings in detail, the hereinafter described tripping device and the operating parts of the switching unit of the circuit breaker are enclosed within a casing 10 provided with a cover 12, said casing and its cover being preferably molded from any suitable plastic, for example, "Bakelite." A separately formed mounting unit 14 (Fig. 15), also molded or otherwise formed from a suitable plastic, is set into the casing at one end thereof as shown in Fig. 1 and is secured in position by screws 18 (Fig. 7) which extend through openings 20 in the bottom 22 of the casing and engage and thereby fasten the line terminal connecting members 24 in position. The terminal connecting members 24 are thus secured in mechanical and electrical engagement with companion terminal members 26, 28 and 30. Said terminal members 26, 28 and 30 are secured to the base 32 of mounting member 14 by hollow pins 34 which have their opposite ends flanged or peened over the companion terminal member and the bottom of base 32 of the mounting member as indicated at 36 and 38, respectively (Figs. 15 and 16). The openings 40 in hollow pins 34 register with the openings 20 through which the screws 18 are entered for securing the terminal connecting members 24 in position. The mounting member 14 is provided with integral upstanding posts 42 which form barriers between the several terminal connecting members 24 and the adjacent portions of the terminals 26, 28 and 30. Said terminals will be subsequently more specifically described in explaining the construction of the tripping device. The terminal connecting members 44 for the load side of the circuit breaker are shown in Fig. 2, said terminal connecting members being fastened to the companion terminal members 46 by screws 48 which are entered through openings 50 in the bottom of the casing (Figs. 6 and 7). Barriers 52 integral with the casing 10 separate the terminals 46 and the load terminal connecting members 44 from each other. Openings 54 are provided adjacent the four corners of the casing 10 for bolts 56 for removaly fastening the cover 12 to the casing. Two of said openings 54 are for bolts by which the unit is fastened to a support, the holes for two other fastening bolts for securing the unit to a support being indicated at 57.

The switching unit of the circuit breaker comprises a one-piece manually operable member 58 molded or otherwise formed from insulating material, for example, "Bakelite." Said member is positioned in the casing 10 and extending transversely thereof between the opposite sides 60 of the casing. Manually operable member 58 has an arcuate segmental portion 62 from which an integral finger grip 64 extends for access externally of the casing through a slot 66 provided in the arcuate portion 68 of the cover 12. As illustrated in Fig. 6, the inner surface of the arcuate cover portion 68 lies adjacent, with slight clearance, to the segmental arcuate portion 62 of the manually operable member 58. Manually operable member 58 is mounted for pivotal movement in casing 10 by means of pivot pins 70 and 72 which are fixed in the axially aligned end openings 74 and 76, respectively, by the milled or roughened pin-portions 77 and 78. The circular heads 80 and 82 of pins 70 and 72 constitute trunnions and are received in bearing openings in bearing plates 84 which are mounted in vertical grooves 86 in the adjacent side walls 60 of the casing, said grooves being open at the top or front of the casing. Retaining plates 84 are held in position by the lower edges 87 of the side flanges 88 of the cover.

Figure 8:
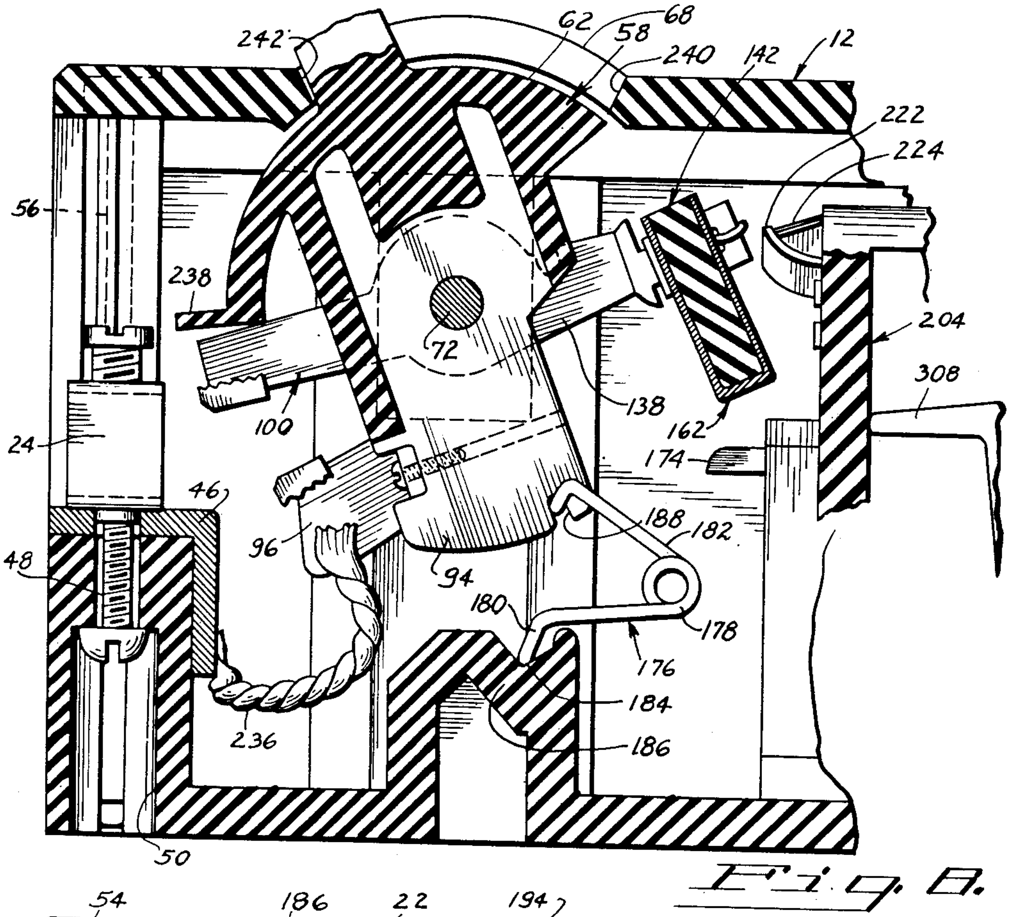
Fig. 8 is a sectional view on the line 8—8 of Fig. 1.

The manually operable member 58 has axially or laterally spaced integral web portions 90, 92, and 94. Contacts 96, one for each pole of the breaker or switch, are secured to said web portions, respectively. Contact members 98, 100 and 102, each in the form of a lever, are pivoted, respectively, on the end pins 70 and 72 and upon an intermediate pin 104 which is formed of insulation. The insulation pin 104 has a sliding fit in the intermediate openings 106 which are in axial alignment with the end openings 74 and 76. Pin 72 extends through an opening 108 and abuts the end of pin 104, the opposite end of which is abutted by the end of pin 70. It will be understood that pin 104 and contact member 102 which is pivoted on said pin are assembled with the manually operable member 58 before one of the end pins 70 or 72 and the companion contact member pivotally mounted thereon are mounted on said manually operable member. As pins 70 and 72 are preferably formed of steel or other metal, the insulation pin 104 insulates said first mentioned pins from each other. It will be noted that the end pins 70 and 72 are provided with circular bearing portions 110 and 112, respectively, between the shank and head portions of the respective pins to provide bearings for the contact members 98 and 100. Movement of contact members 98 and 100 axially of their pivots is prevented by the bosses 114 and 116 on the web portions 90 and 94, respectively, and by the adjacent surfaces of the bearing plates 84, while movement of the contact member 102 axially of its pivot pin 104 can not occur because said contact member fits, with a slight clearance, in the space between the web 92 and web 118. Webs 118 and 120 provide barriers between the contact members at the several poles of the breaker and are provided with ribs 122 which fit with clearance in companion arcuate grooves 124, respectively, in the upper edges of upstanding projections 126 on the bottom or back wall of casing 10. The contact members 98, 100 and 102 are biased for movement away from their respective companion contacts 96 by two springs, each of which has a coiled portion 128 (Figs. 4, 5 and 8) and end portions 130 and 132 which bear against the edge 134 of the arcuate portion 62 and against one arm of the companion lever contact members 98 and 100, respectively, the spring engaged lever arms of said contact members 98 and 100 being indicated at 136 and 138, respectively, said springs acting on member 102 through the cross member 142 hereinafter described.

Figures 17, 18, 19, 20:
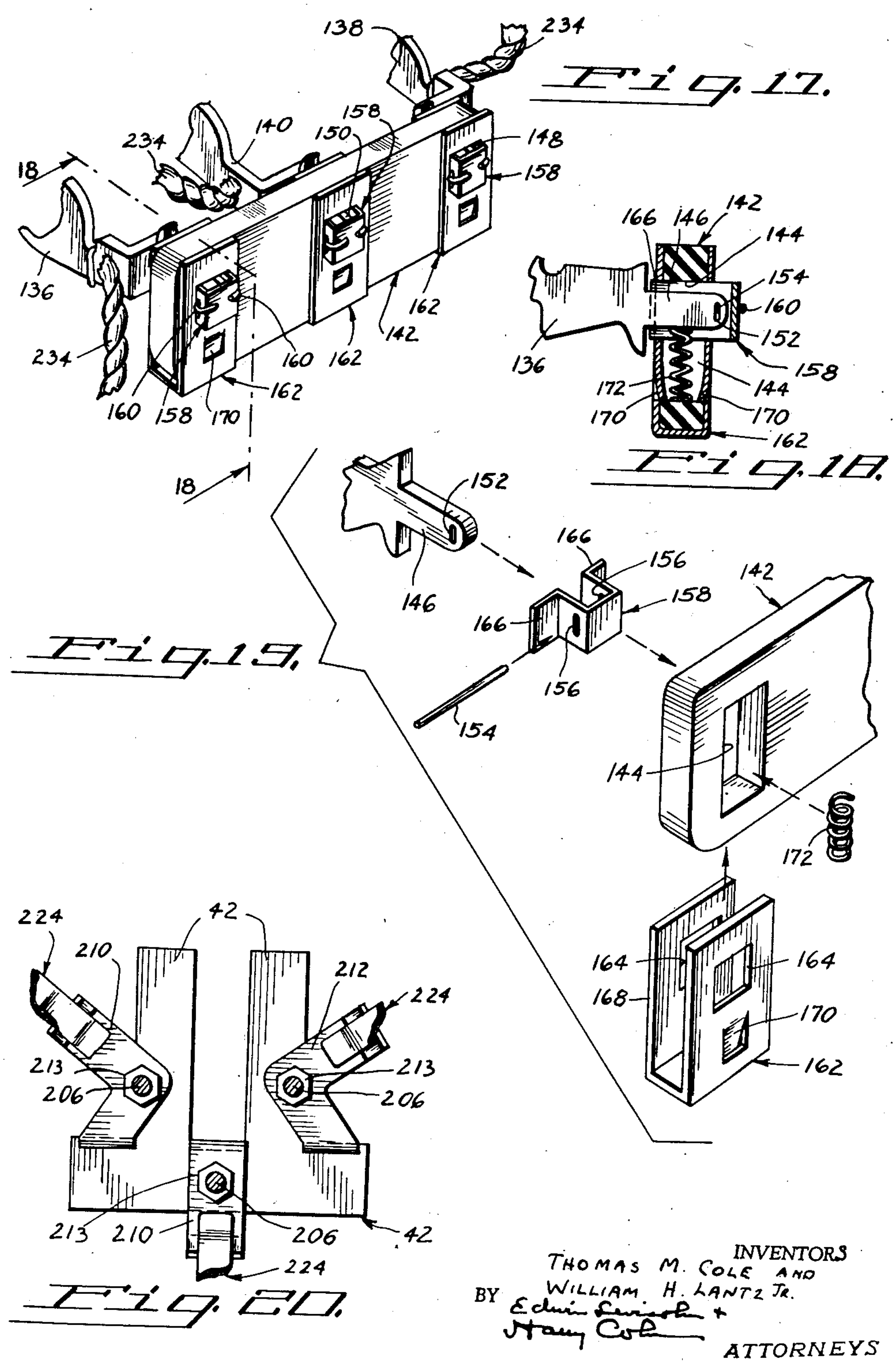
Fig. 17 is a perspective view of the trip released means which also constitutes means for mechanically connecting certain of the contact members of the circuit breaker for conjoint operation.
Fig. 18 is a sectional view on the line 18—18 of Fig. 17.
Fig. 19 is a perspective view of certain of the parts illustrated in Fig. 17, said parts being shown in separated but related positions.
Fig. 20 is a sectional view on the line 20—20 of Fig. 16, parts being omitted for the purpose of illustration.

Contact members 98, 100 and 102 are mechanically connected for joint operation by a rigid cross member 142 (Figs. 3 to 6 and 17). Cross member 142 also constitutes a trip released member, as will subsequently more fully appear in the explanation of the tripping device. In order to compensate for any inequalities in the engagement of the contact members 98, 100 and 102 with their companion contacts 96, respectively, which are fixed to the manually operable member 58, provision is made for allowing a limited movement between the cross member and the lever arms 136, 138 and 140 of said contact members 98, 100 and 102, respectively. The means provided for this purpose is illustrated more clearly in Figs. 17 to 19, and by reference thereto, it will be noted that the cross member 142 is provided with a plurality of spaced openings 144 into which the laterally offset ends 146, 148 and 150 of the contact member lever arms 136, 138 and 140, respectively, project. Figs. 18 and 19 illustrate the connection in respect to the offset end 146 of the arm 136 of the contact member 98, but it will be understood that each of the offset ends of the arms of the contact members are connected to the cross member 142 in the same manner. Thus, as illustrated, the end portion 146 of arm 136 is provided with a small arcuate opening or slot 152 through which a pivot pin 154 projects, said pivot pin passing through a pair of aligned openings 156 in a bracket 158, the opposite end portions 160 of said pivot pin being bent around the companion bracket as illustrated in Fig. 17. Each bracket 158 projects into a companion opening 144 in the cross member 142 and is held in position by a U-shaped clip 162 which engages the cross member 142 at the opposite sides thereof. More particularly, each U-shaped clip 162 is provided with a pair of aligned openings 164 in which the companion bracket 158 fits, each of said brackets having a pair of outturned ends 166 which bear against the adjacent side 168 of the companion clip 162, it being understood that the outturned ends 166 of each bracket 158 are formed after the bracket is inserted through the companion openings 164 of the companion clip 162. Each clip is provided with a pair of inwardly directed struck-out tongues 170 which engage the cross member 142 at the bottom of the opening 144 for securing the clip to said cross member. A spring 172 is positioned in each opening 144 and bears against the end 146, 148, or 150 of the companion contact member as illustrated in Fig. 18, for resiliently opposing movement between connecting member 142 and contact members 98, 100 and 102. It will be understood that cross member 142 is formed of insulation material so that the contact members are insulated from each other.

Figure 4:
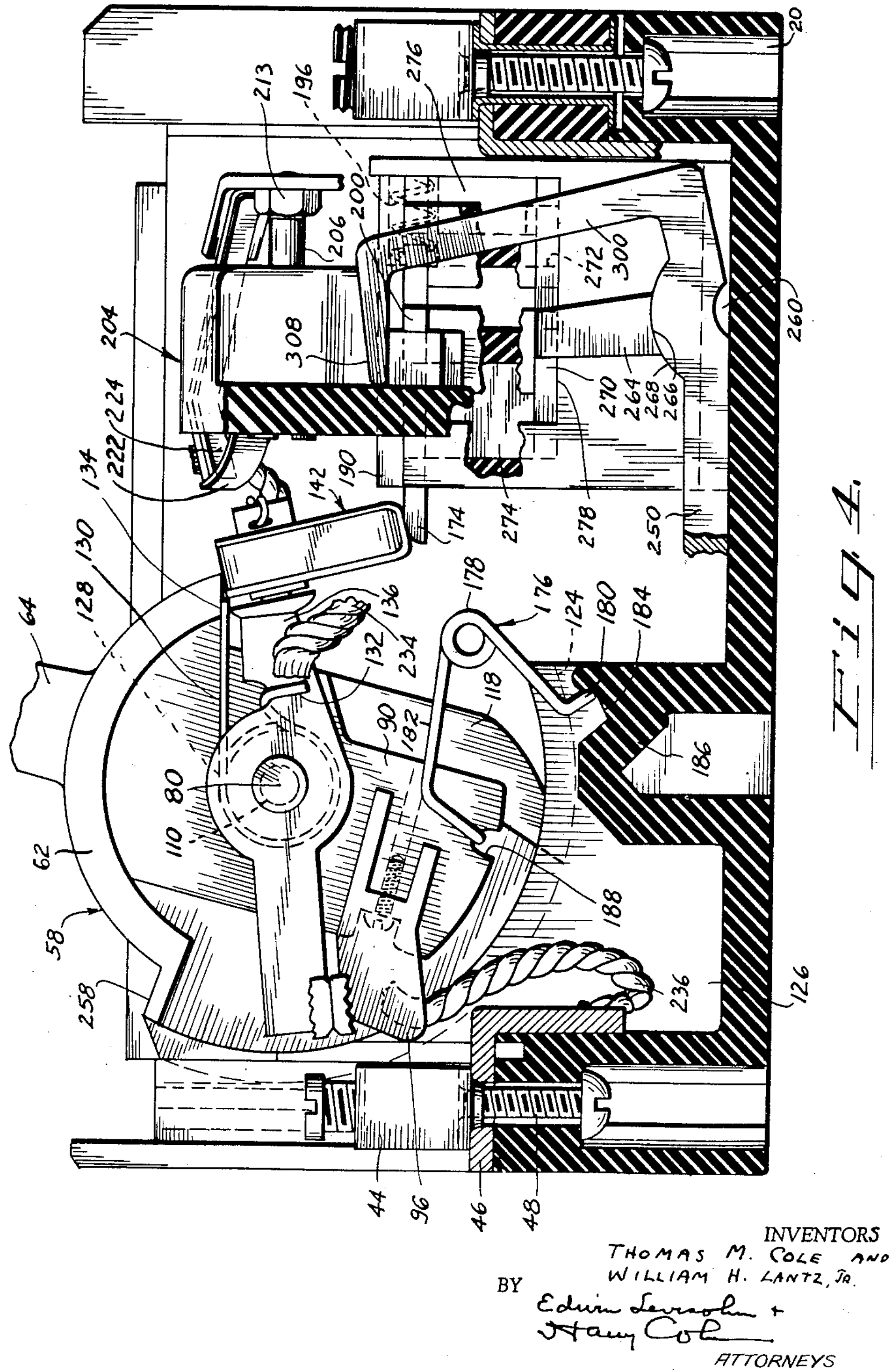
Fig. 4 is a sectional view on the line 4—4 of Fig. 3, the breaker being closed.

In the normal condition of the circuit breaker, cross member 142 is held against movement in a clockwise direction (viewing Fig. 4) beyond a predetermined point by the spring projected members 174 of the tripping device which will hereinafter be more particularly described. When the cross member 142 is thus held against movement in a clockwise direction beyond the spring projected members 174, the circuit breaker can be manually opened and closed by pivotal movement of the manually operable member 58 in counterclockwise and clockwise directions, respectively (viewing Fig. 4), the closed condition of the circuit breaker being illustrated in Fig. 4, and the manually opened condition of the circuit breaker being illustrated in Fig. 6. Provision is made for engaging and disengaging the contact members 98, 100 and 102 with their companion contacts 96, respectively, with a snap action, in the manual operation of the circuit breaker. For this purpose, the springs 176 are provided. Each of said springs has an intermediate coiled portion 178 and end portions 180 and 182. As shown in the drawings, there are two springs 176, the ends 180 of which engage in companion recesses 184, respectively, in the inner ends of the laterally spaced inwardly molded projections 186 (see Figs. 6 and 7). The other ends 182 of the two springs 176 engage the manually operable member 58 in notches 188 in the web portions 90 and 94 respectively (Figs. 4 and 6).

Figure 10:
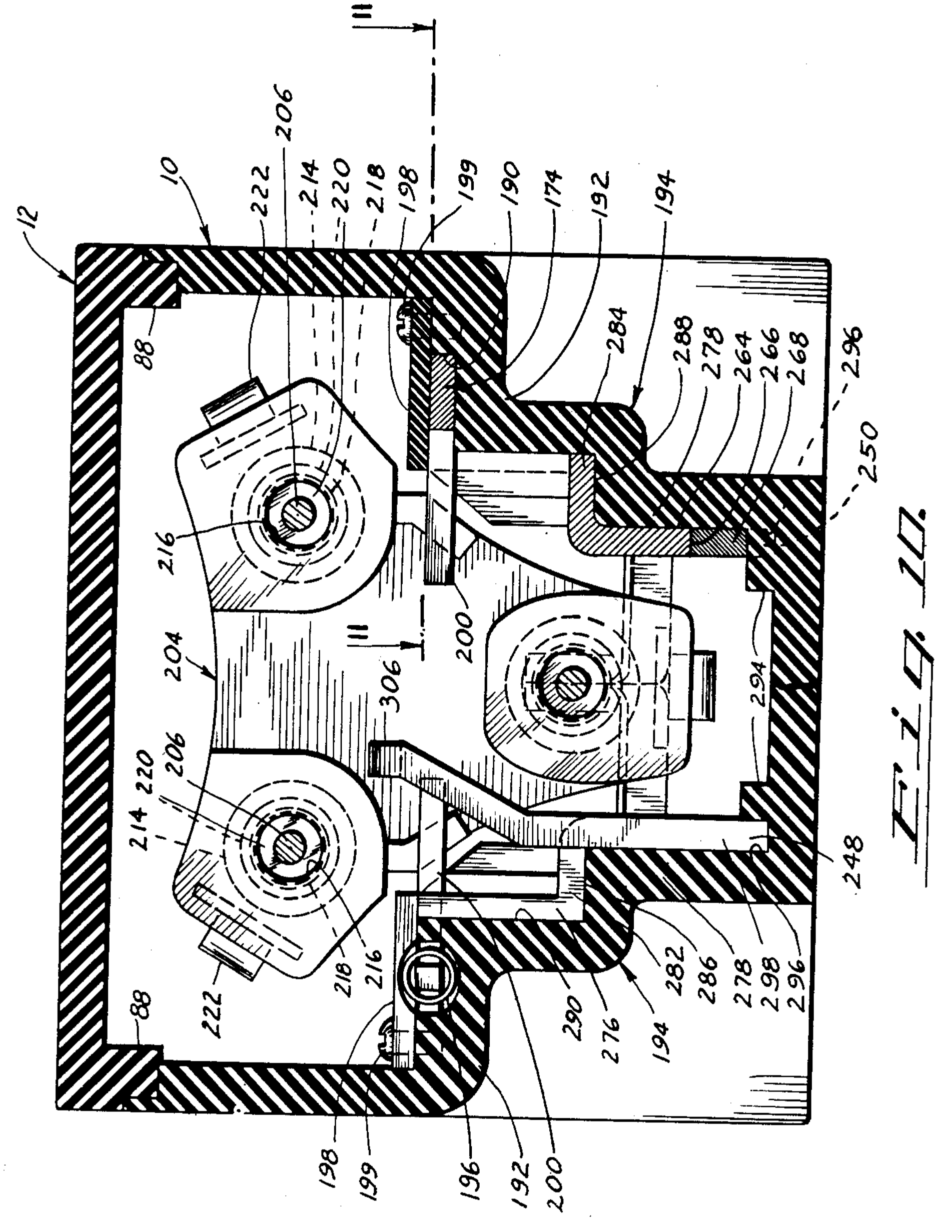
Fig. 10 is a sectional view on the line 10—10 of Fig. 3.

The tripping device for automatically opening the circuit breaker at all of the poles thereof upon the occurrence of an overload or predetermined current flow at any one of the poles of the circuit breaker will now be described. As explained above, when the circuit breaker is manually closed. the cross member 142 engages the spring projected members 174 which in the projected positions thereof are in the path of movement of said cross member whereby the movement of the latter in a clockwise direction, viewing Fig. 4, beyond a predetermined point, is limited by the engagement of said cross member with said spring projected members. The latter are mounted for sliding movement in grooves 190 formed in the inwardly extending ledges 192 (Fig. 10) of the inwardly molded portions 194 of the casing. A spring 196 is positioned in each of said grooves for projecting the companion member 174 and for opposing movement of the latter to its retracted position. Plates 198 of insulation material are secured to ledges 192 over spring projected members 174 by screws 199 or in any other suitable way and form, with the walls of the companion grooves 190, guideways for the spring projected members 174. Each of the spring projected members 174 is provided with an integral laterally extending arm 200 which is movable in a recess 202 (Fig. 11) in ledge 192 to allow movement of arm 200 when the spring projected member 174 which carries said arm moves in the companion groove 190 of said ledge.

Spring projected holding members 174 are moved to their retracted positions against the force of springs 196 by and under the control of a trip releasing member 204, which is shown in perspective in Fig. 15. Said trip releasing member 204 is formed of insulation material and is mounted for movement on a plurality of rods 206, there being as here shown three of said rods disposed in triangular relation. Said rods are fixed at their outer thread ends to the terminal members 26, 28 and 30, respectively. More particularly, as illustrated in Fig. 16, the central terminal member 28 has a portion 208 to which a companion rod 206 is secured. As illustrated in Fig. 15 the terminal member 30 has an upwardly directed portion 210 provided with a threaded opening for the securement thereto of another of said rods 206, while as illustrated in Fig. 16, the terminal member 26 has a similar upwardly extending portion 212 for the securement thereto of the third rod 206. Nuts 213 are provided on rods 206 for locking said rods to the companion terminal members. The relation of parts 208, 210 and 212 of the terminal members 28, 30 and 26, respectively, is illustrated more clearly in Fig. 20.

The trip releasing member is provided with recesses 214 into which the rods 206 project, each of said recesses having an opening 216 surrounding the companion rod 206, said opening being somewhat larger in diameter than the rod so that the trip releasing member 204 not only can move longitudinally of said rods 206, but can also tilt thereon. A spring 218 is disposed in each recess 214 and bears at one end thereof against the inner end of said recess and at the opposite end thereof against the head 220 provided on rods 206, as illustrated in Fig. 16. Thus trip releasing member 204 is spring retracted and is movable to a projected position against the force of the spring 218 in the recesses 214. A plurality of triangularly arranged retaining members 222, preferably formed of metal are securely fixed in trip releasing member 204, preferably in the molding of said trip releasing member. In the projected position of trip releasing member 204, said retaining members 222 are engaged adjacent their outer ends by triangularly arranged current responsive members 224 each of which consists of a bimetallic or thermostatic strip. The inner end of each bimetallic strip 224 is secured to the terminal member at the companion pole, and more particularly to the vertical part 208, 210 or 212 of the companion terminal, as illustrated in Fig. 16 with reference to the securement of the bimetallic strip 224 to the vertical portion 208 of the terminal member 28. For this purpose, the bimetallic strip 224 has a bent end portion 226 which is welded to the part 208, 210 or 212 of the corresponding terminal member. In order to provide for the adjustment of the thermostatic strips 224 in relation to the ends of the companion retaining members 222 of the trip releasing member, the parts 208, 210 and 212 of the terminal members are provided with bent end portions 228, 230 and 232, respectively, each extending longitudinally of the companion thermostatic strip 224, as illustrated more clearly in Fig. 16. These end portions of the terminal members are each provided with an adjusting screw 233 in threaded engagement therewith and bearing on the companion thermostatic strip for adjusting the latter in relation to the companion retaining member 222 in a way obvious from the illustration. Each thermostatic strip 224 is electrically connected by a pig tail or other flexible conductor 234 to one of the contact members 98, 100 and 102. The stationary contacts 96 are connected to the companion terminals 46 at the load side of the breaker by similar flexible conductors or pig tails 236.

From the above description, it will be understood that upon the occurrence of an overload or other predetermined current flow at one or more poles, the corresponding bimetallic strip 224 through which the current passes will flex out of engagement with the companion retaining member 222 of the trip releasing member 204 whereby the latter will be moved to its retracted position by the springs 218. As the arms 200 of the spring projected holding members 174 are in the path of retractive movement of said trip releasing member 204, said arms are engaged by said trip releasing member during the movement of the latter to its retracted position and thereby the spring projected holding members 174 are moved to their retracted positions to release the cross member 142 whereby to effect the tripping of the breaker. More particularly, when the spring projected holding members 174 are retracted, thereby releasing the cross member 142, the springs which engage or act upon the contact members 98, 100 and 102 move the latter clockwise, viewing Fig. 5, out of engagement with the companion contact members 96, respectively, until the forward arms of said first mentioned contact members engage the flange 238 at the forward edge of the arcuate part 62 of the manually operable member 58, and thereafter said contact members 98, 100, 102 continue to move pivotally in the same direction together with the manual operating member until the finger piece 64 thereof engages the edge 240 of the cover 12 at the slot 66. The opposite edge 242 of said slot is engaged by finger piece 64 of the manually operable member when the circuit breaker is manually opened, which is accomplished by moving said manually operable member in a counterclockwise direction, viewing Fig. 4, following the resetting of the breaker.

Figure 5:
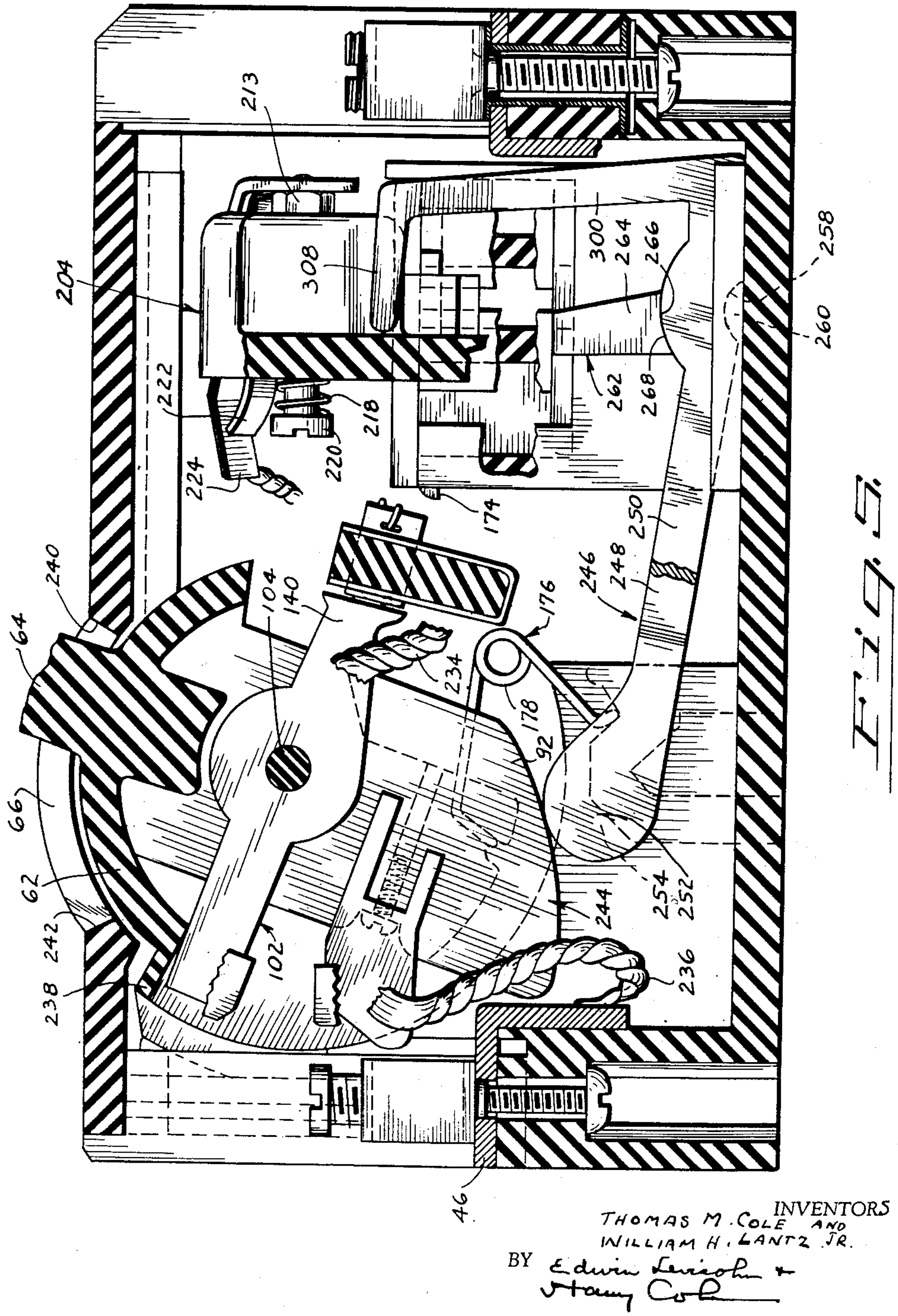
Fig. 5 is a sectional view on the line 5—5 of Fig. 3, but with the casing cover in place, the circuit breaker being tripped.
Figures 11, 12, 13, 14:
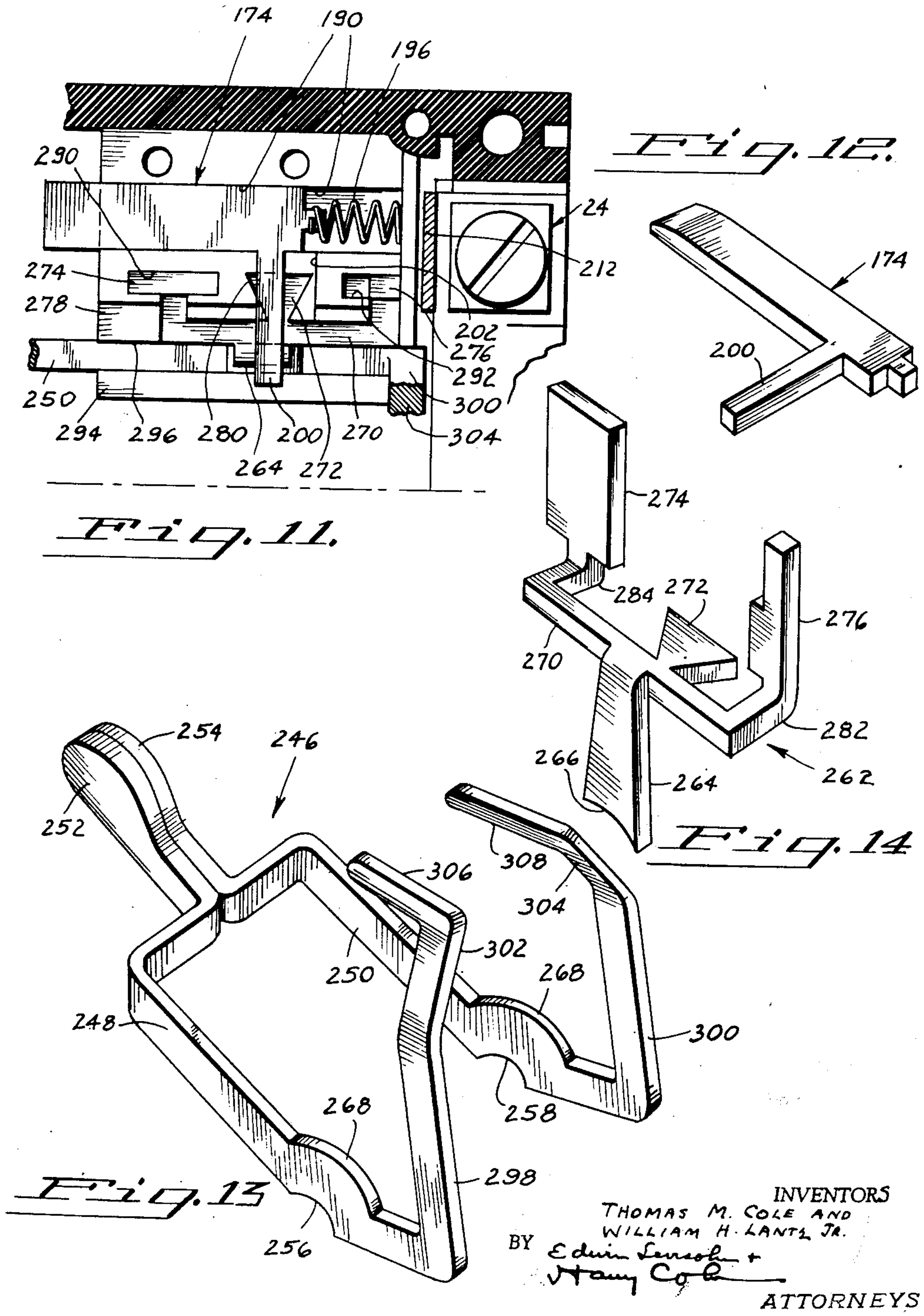
Fig. 11 is a sectional view on the line 11—11 of Fig. 10.
Fig. 12 is a perspective view of one of the spring projected holding members of the tripping device.
Fig. 13 is a perspective view of a lever device forming part of the means for resetting the tripping device following the tripping of the circuit breaker.
Fig. 14 is a perspective view of one of the members for holding the lever device illustrated in Fig. 13 on a companion pivot.

As indicated above, provision is made for resetting the breaker following the tripping thereof so that said breaker can be manually closed. For this purpose, the manually operable member 58 is provided with a cam 244 which cooperates with a cam operated lever device 246. As illustrated in Fig. 5, the cam 244 is formed as an integral part of the web 92 of said other manually operable member 58. The cam operated lever device 246, which is illustrated in perspective in Fig. 13, comprises the laterally spaced lever arms 248 and 250 which are bent toward each other at their forward ends and welded in abutting face-to-face relation, as illustrated in Fig. 13, said forward ends 252 and 254 being appropriately contoured at their peripheral edges for operative engagement by the edge of cam 244 as illustrated in Fig. 5. Lever arms 248 and 250 of the cam lever device 246 are provided with arcuate bearing recesses 256 and 258 which engage arcuate bearing members 260 formed as molded projections on the bottom of casing 12 interiorly thereof, whereby said cam operated lever device 246 is mounted for pivotal movement in the casing. The arms 248 and 250 are held in pivotal engagement with the companion bearings 260 of the casing by the retaining members 262 one of which is shown in perspective in Fig. 14. Each of said retaining members comprises a downwardly extending arm 264 having a lower arcuate edge 266 which engages an arcuate edge portion 268 of the companion arm of the lever device 246 (Figs. 4 and 5). Also, the retaining member 262 comprises a cross bar 270, a transverse dovetail projection 272, and upstanding projections 274 and 276. The bars 270 of the two retaining members 262 are supported on the ledges 278 of the casing (Figs. 10 and 11), with the transverse projections 272 fitting in correspondingly shaped dove-tail recesses 280 formed in the casing portions 194 adjacent said ledges 278, respectively. The transverse end portions 282 and 284 of bar 270 of the retaining member 262 are positioned in correspondingly shaped recesses 286 and 288, respectively, while the upstanding portions 274 and 276 are positioned in vertical grooves 290 and 292, respectively, extending upwardly from the ledges 278 to the top of the ledges 192. The upper ends of parts 274 and 276 of the retaining members 262 are engaged by the plates 198 which overlie the spring projected holding members 174. Thus, the retaining members 262 are held in fixed position in the casing and by engaging the arcuate portions 268 of the arms of the cam operated lever device 246 hold said arms in pivotal engagement on their companion bearings 260. Longitudinally extending ribs 294 molded on the bottom of the casing interiorly thereof, and the adjacent longitudinally extending wall portions 296 of said casing provide grooves in which the lever arms 248 and 250 movably fit whereby said lever arms are held against movement toward or away from each other.

The lever arms 248 and 250 have vertical upstanding parallel portions 298 and 300, inwardly inclined portions 302 and 304 and forwardly inclined horizontal end portions 306 and 308 which are positioned to engage the trip releasing member 204 (Figs. 4, 5 and 10) for moving the latter, against the force of springs 218, to its projected or set position in which the ends of the bimetallic strips 224 engage the retaining members 222 of said releasing member 204, when said bimetallic strips flex inwardly upon cooling thereof following the tripping of the circuit breaker. The breaker resetting operation takes place by moving the manually operable member 58 in a counter-clockwise direction, viewing Fig. 5, whereby the lever device 246 is pivotally moved also in a counterclockwise direction by the engagement of the edge of the cam 244 with the peripheral edge of the cam follower portion constituted by the ends 252 and 254 of the lever arms 248 and 250. It will be understood that the cam 244 and said cam follower of the cam operated lever device 246 are contoured so that the cross member 142 of the switch unit moves upwardly beyond the spring projected holding members 174 before the trip releasing member 204 is moved sufficiently to release said spring projected members 174 for movement to their projected positions. In this connection it will be understood that when the manually operable member is moved counter-clockwise for resetting the circuit breaker, the contact members 98, 100 and 102 are engaged by the flange 238 and are thus pivotally moved in a counter-clockwise direction to position the cross member 142 connected to said contact members upwardly or forwardly of the casing beyond the spring projected members 174. Thereafter the manually operable member is moved in a clockwise direction whereupon the cross member 142 engages the spring projected members 174, thus holding the contact members 98, 100 and 102 stationary without, however, preventing the completion of the movement of the manually operable member in said clockwise direction, which does not take place until the contacts 96 engage the companion contact members 98, 100 and 102, said contact engagement for closing the breaker occurring with a snap action as a result of the overcentering springs 176.

While we have shown and described the preferred embodiment of our invention, it will be understood that the latter may be embodied otherwise than as herein specifically illustrated or described and that in the presently preferred embodiment herein shown or described certain changes in the details of construction and in the arrangement of parts may be made without departing from the underlying principles of the invention within the scope of the appended claims.

This application is a division of our application, Serial No. 548,550, filed August 8, 1944, now Patent No. 2,487,637, dated November 8, 1949.

Certain features shown herein and not claimed herein are claimed in our divisional application, Serial No. 307,224, filed August 28, 1952.

Having thus described our invention, what we claim and desire to secure by Letters Patent, is:

1. A multi-pole circuit breaker, comprising a one-piece manually operable member carrying a plurality of contacts, one for each pole, said contacts being fixed to said member in laterally spaced relation, means for mounting said manually operable member for pivotal movement, contact members mounted for pivotal movement co-axially with said manually-operable member but relative to the latter and positioned in laterally spaced relation for engagement with said contacts, respectively, when the breaker is closed, certain of said contact members being mounted on said mounting-means, spring means for biasing said contact-members for movement to disengage the companion contacts, and trip-releasable means for holding said contact members stationary in opposition to said spring means whereby said contacts fixed to said manually-operable member are engageable with and disengageable from said spring-biased contact members, respectively, by movement of said manually-operable member in opposite directions, respectively, while said contact members are held stationary by said trip-releasable means.

2. A multi-pole circuit breaker comprising a manually-operable member carrying a plurality of contacts, one for each pole, said contacts being fixed to said member in laterally spaced relation, means for mounting said manually operable member for pivotal movement, contact members mounted for pivotal movement co-axially with said manually-operable member but relative to the latter and positioned in laterally spaced relation for engagement with said contacts, respectively, when the breaker is closed, spring means for biasing said contact-members for movement to disengage the companion contacts, and trip-releasable means connecting said contact members for conjoint movement and for holding said contact members stationary in opposition to said spring means, said contact members having a limited movement in relation to said connecting means to compensate for inequalities in the engagement of said contact members with the companion contacts, respectively, upon closing of the breaker.

3. A multi-pole circuit breaker comprising a manually-operable member carrying a plurality of contacts, one for each pole, said contacts being fixed to said member in laterally spaced relation, means for mounting said manually-operable member for pivotal movement, contact members mounted for pivotal movement co-axially with said manually-operable member but relative to the latter and positioned in laterally spaced relation for engagement with said contacts, respectively, when the breaker is closed, spring means for biasing said contact-members for movement to disengage the companion contacts, and trip-releasable means connecting said contact members for conjoint movement and for holding said contact members stationary in opposition to said spring means, said contact members having a limited movement in relation to said connecting means to compensate for inequalities in the engagement of said contact members with the companion contacts, respectively, upon closing of the breaker, and resilient means associated with said connecting means and said contact members for resiliently opposing said limited movement of said contact members in relation to said connecting means.

4. A multi-pole circuit breaker comprising a manually-operable member having axially aligned end and intermediate openings, pins fixed to said member in said end-openings, respectively, and projecting from the opposite ends of said member, said pins having outer end portions providing trunnions for supporting said member for pivotal movement about the axis of said aligned openings, said intermediate openings being spaced from each other, an intermediate pin fixed in said intermediate openings and extending across the space therebetween, contact members pivotally mounted on said first mentioned pins, respectively, between said end portions thereof and the adjacent ends, respectively, of said manually-operable member, a contact member pivotally mounted on said intermediate pin in the space between said intermediate opeings, and contact members carried by said manually operable member in position to engage said contact members, respectively, when the breaker is closed.

5. A multi-pole circuit breaker comprising a manually-operable member having axially aligned end and intermediate openings, pins carried by said member in said end-openings, respectively, and projecting from the opposite ends of said member, said pins having outer end portions providing trunnions for supporting said member for pivotal movement about the axis of said aligned openings, said intermediate openings being spaced from each other, an intermediate pin positioned in said intermediate openings and extending across the space therebetween, contact members pivotally mounted on said first mentioned pins, respectively, between said end portions thereof and the adjacent ends, respectively, of said manually-operable member, a contact member pivotally mounted on said intermediate pin in the space between said intermediate openings, and contact members carried by said manually operable member in position to engage said contact members, respectively, when the breaker is closed.

6. A multi-pole circuit breaker comprising a one-piece manually-operable member carrying a plurality of contacts, one for each pole, said contacts being fixed to said member in laterally spaced relation, means for mounting said manually-operable member for pivotal movement, and contact members mounted for pivotal movement co-axially with said manually-operable member but relative to the latter and positioned in laterally spaced relation for engagement with said contacts, respectively, when the breaker is closed, certain of said contact members being mounted on said mounting-means.

7. A multi-pole circuit breaker comprising a one-piece manually-operable member carrying a plurality of contacts, one for each pole, said contacts being fixed to said member in laterally spaced relation, means for mounting said manually-operable member for pivotal movement, contact members mounted for pivotal movement co-axially with said manually-operable member but relative to the latter and positioned in laterally spaced relation for engagement with said contacts, respectively, when the breaker is closed, said mounting means comprising members projecting from the opposite ends, respectively, of said manually operable member, each of said projecting members forming a support for one of said contact members, and a support for another of said contact members secured in said manually operable member between said projecting members.

8. A multi-pole circuit breaker comprising a one-piece manually operable insulation member mounted for pivotal movement and carrying a plurality of contacts, one for each pole, said contacts being fixed to said member in laterally spaced relation, means for mounting said manually-operable member for pivotal movement, contact members mounted for pivotal movement co-axially with said manually-operable member but relative to the latter and positioned in laterally spaced relation for engagement with said contacts, respectively, when the breaker is closed, spring means for biasing said contact-members for movement to disengage the companion contacts, trip-releasable means connecting said contact members for conjoint movement and for holding said contact members stationary in opposition to said spring means, trip-operated means for controlling said connecting means, and means including a member integral with said manually operable member for re-setting said trip-operated means.

9. A multi-pole circuit breaker comprising a manually-operable member carrying a plurality of contacts, one for each pole, said contacts being fixed to said member in laterally spaced relation, means for mounting said manually operable member for pivotal movement, contact members mounted for pivotal movement coaxially with said manually-operable member but relative to the latter and positioned in laterally spaced relation for engagement with said contacts, respectively, when the breaker is closed, spring means for biasing said contact-members for movement to disengage the companion contacts, and means connecting said contact members for conjoint movement and for holding said contact members stationary in opposition to said spring means, said contact members having a limited movement in relation to said connecting means to compensate for inequalities in the engagement of said contact members with the companion contacts, respectively, upon closing of the breaker.

10. A multi-pole circuit breaker comprising a manually-operable member carrying a plurality of contacts, one for each pole, said contacts being fixed to said member in laterally spaced relation, means for mounting said manually-operable member for pivotal movement, contact members mounted for pivotal movement co-axially with said manually-operable member but relative to the latter and positioned in laterally spaced relation for engagement with said contacts, respectively, when the breaker is closed, spring means for biasing said contact-members for movement to disengage the companion contacts, and means connecting said contact members for conjoint movement and for holding said contact members stationary in opposition to said spring means, said contact members having a limited movement in relation to said connecting means to compensate for inequalities in the engagement of said contact members with the companion contacts, respectively, upon closing of the breaker, and resilient means associated with said connecting means and said contact members for resiliently opposing said limited movement of said contact members in relation to said connecting means.

11. A multi-pole circuit breaker comprising manually-operable member having axially aligned end and intermediate openings, pins fixed to said member in said end-openings, respectively, and projecting from the opposite ends of said member, said pins having outer end portions providing trunnions for supporting said member for pivotal movement about the axis of said aligned openings, said intermediate openings being spaced from each other, an intermediate pin fixed in said intermediate openings and extending across the space therebetween, contact members pivotally mounted on said first mentioned pins, respectively, between said end portions thereof and the adjacent ends, respectively, of said manually-operable member, a contact member pivotally mounted on said intermediate pin in the space between said intermediate openings, and contact members carried by said manually operable member in position to engage said contact members, respectively, when the breaker is closed, and insulation means connecting said contact members for conjoint movement, said last mentioned means having provision for a limited movement thereof in relation to each of said contact members.

12. A multi-pole circuit breaker comprising a manually-operable member having axially aligned end and intermediate openings, pins carried by said member in said end-openings, respectively, and projecting from the opposite ends of said member, said pins having outer end portions providing trunnions for supporting said member for pivotal movement about the axis of said aligned openings, said intermediate openings being spaced from each other, an intermediate pin positioned in said intermediate openings and extending across the space therebetween, contact members pivotally mounted on said first mentioned pins, respectively, between said end portions thereof and the adjacent ends, respectively, of said manually-operable member, a contact member pivotally mounted on said intermediate pin in the space between said intermediate openings, and contact members carried by said manually operable member in position to engage said contact members, respectively, when the breaker is closed, and insulation means connecting said contact members for conjoint movement, said last mentioned means having provision for a limited movement thereof in relation to each of said contact members.

13. A multi-pole circuit breaker comprising a one-piece manually-operable member carrying a plurality of contacts, one for each pole, said contacts being fixed to said member in laterally spaced relation, means for mounting said manually-operable member for pivotal movement, contact members mounted for pivotal movement co-axially with said manually-operable member but relative to the latter and positioned in laterally spaced relation for engagement with said contacts, respectively, when the breaker is closed, said mounting means having parts projecting laterally beyond the opposite ends of said manually operable member, at least one of said contact members being mounted on each of said projecting parts, a frame for said breaker, and parts removably mounted on said frame and having openings in which said projecting parts are engaged for supporting said manually operable member.

14. A multi-pole circuit breaker comprising a one-piece manually-operable member carrying a plurality of contacts, one for each pole, said contacts being fixed to said member in laterally spaced relation, means for mounting said manually-operable member for pivotal movement, contact members mounted for pivotal movement co-axially with said manually-operable member but relative to the latter and positioned in laterally spaced relation for engagement with said contacts, respectively, when the breaker is closed, certain of said contact members being mounted on said mounting-means, said mounting means having parts projecting laterally beyond the opposite ends of said manually operable member, a frame for said breaker, and parts removably mounted on said frame and having openings in which said projecting parts are engaged for supporting said manually operable member, said removably mounted parts abutting said certain contact members to prevent movement thereof axially of said mounting means, said frame comprising a casing having an opening through which said manually operable member and the parts carried thereby are insertable as a unit into the casing and are retractable as a unit from the casing.

15. A multi-pole circuit breaker comprising a one-piece manually-operable member carrying a plurality of contacts, one for each pole, said contacts being fixed to said member in laterally spaced relation, means for mounting said manually-operable member for pivotal movement, contact members mounted for pivotal movement co-axially with said manually-operable member but relative to the latter and positioned in laterally spaced relation for engagement with said contacts, respectively, when the breaker is closed, said mounting means having parts projecting laterally beyond the opposite ends of said manually operable member, at least one of said contact members being mounted on each of said projecting parts, a frame for said breaker, and parts removably mounted on said frame and having openings in which said projecting parts are engaged for supporting said manually operable member, said removably mounted parts abutting the contact members mounted on said projecting parts, respectively, to prevent movement thereof axially of said projecting parts, said frame comprising a casing having an opening through which said manually operable member and the parts carried thereby are insertable as a unit into the casing and are retractable as a unit from the casing, said casing having side wall portions to support said removable parts in which said projecting parts are engaged.

16. A multi-pole circuit breaker comprising a one-piece manually-operable member carrying a plurality of contacts, one for each pole, said contacts being fixed to said member in laterally spaced relation, means for mounting said manually-operable member for pivotal movement, contact members mounted for pivotal movement co-axially with said manually-operable member but relative to the latter and positioned in laterally spaced relation for engagement with said contacts, respectively, when the breaker is closed, said mounting means having pins projecting laterally beyond the opposite ends of said manually operable member, one of said contact members being mounted on each of said pins, respectively, a frame for said breaker, and parts removably mounted on said frame and having openings in which said projecting pins are engaged for supporting said manually operable member, said laterally projecting pins being fixed to said manually operable member and being pivotally mounted in said openings, respectively, of the removable parts of the mounting means, said parts abutting said one contact members, and serving to prevent movement thereof axially of said pins.

THOMAS M. COLE.
WILLIAM H. LANTZ, JR.

References Cited in the file of this patent

UNITED STATES PATENTS

| Number | Name | Date |
|---|---|---|
| 2,107,246 | Jackson | Feb. 1, 1938 |
| 2,240,623 | Lindstrom | May 6, 1941 |
| 2,242,717 | Cole | May 20, 1941 |
| 2,295,577 | Hammerly | Sept. 15, 1942 |
| 2,365,120 | Thirlwell | Dec. 12, 1944 |
| 2,421,830 | Cole et al. | June 10, 1947 |
| 2,487,637 | Cole et al. | Nov. 8, 1949 |